No. 619,502. Patented Feb. 14, 1899.
J. POULSEN.
LUMBER RAFT.
(Application filed Jan. 8, 1898.)
(No Model.) 2 Sheets—Sheet 1.
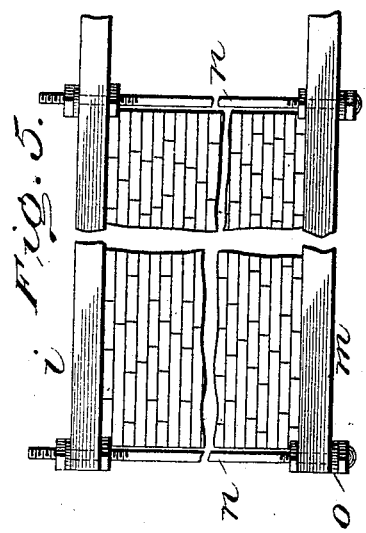
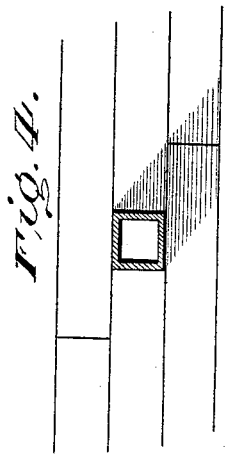
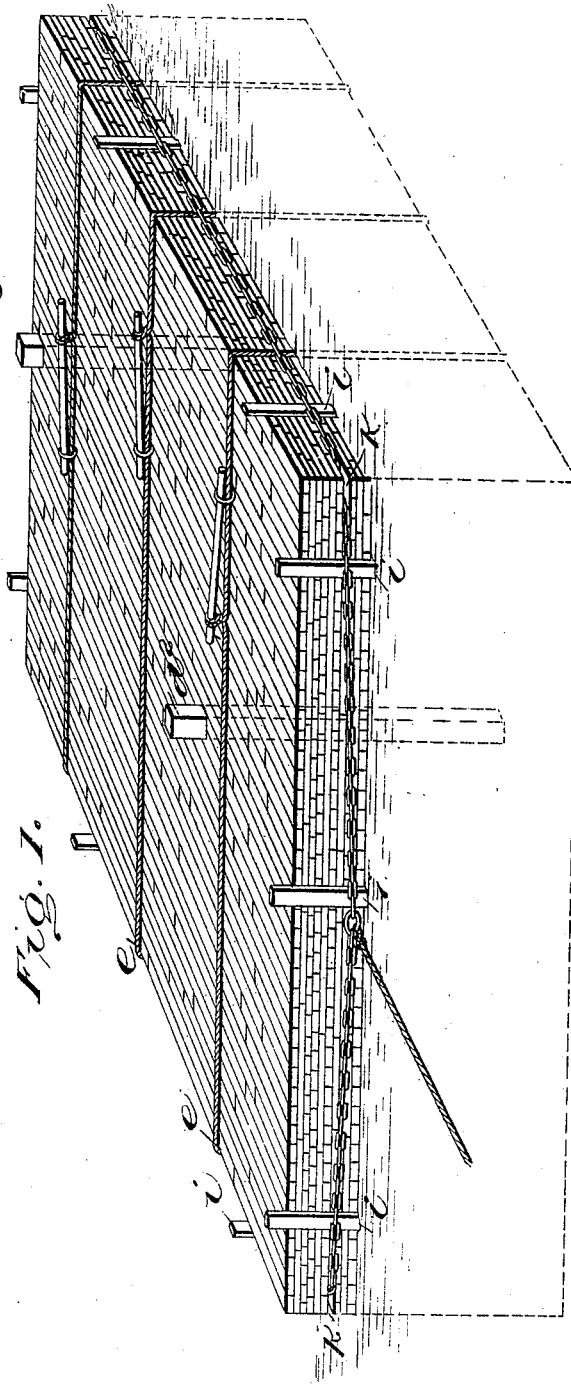
Witnesses
Jno. True
Robt. H. Bishop
Inventor
Johan Poulsen
by J. H. Geisler
Attorney
THE NORRIS PETERS CO., PHOTO-LITHO., WASHINGTON, D. C.

No. 619,502. Patented Feb. 14, 1899.
J. POULSEN.
LUMBER RAFT.
(Application filed Jan. 8, 1898.)
(No Model.) 2 Sheets—Sheet 2.
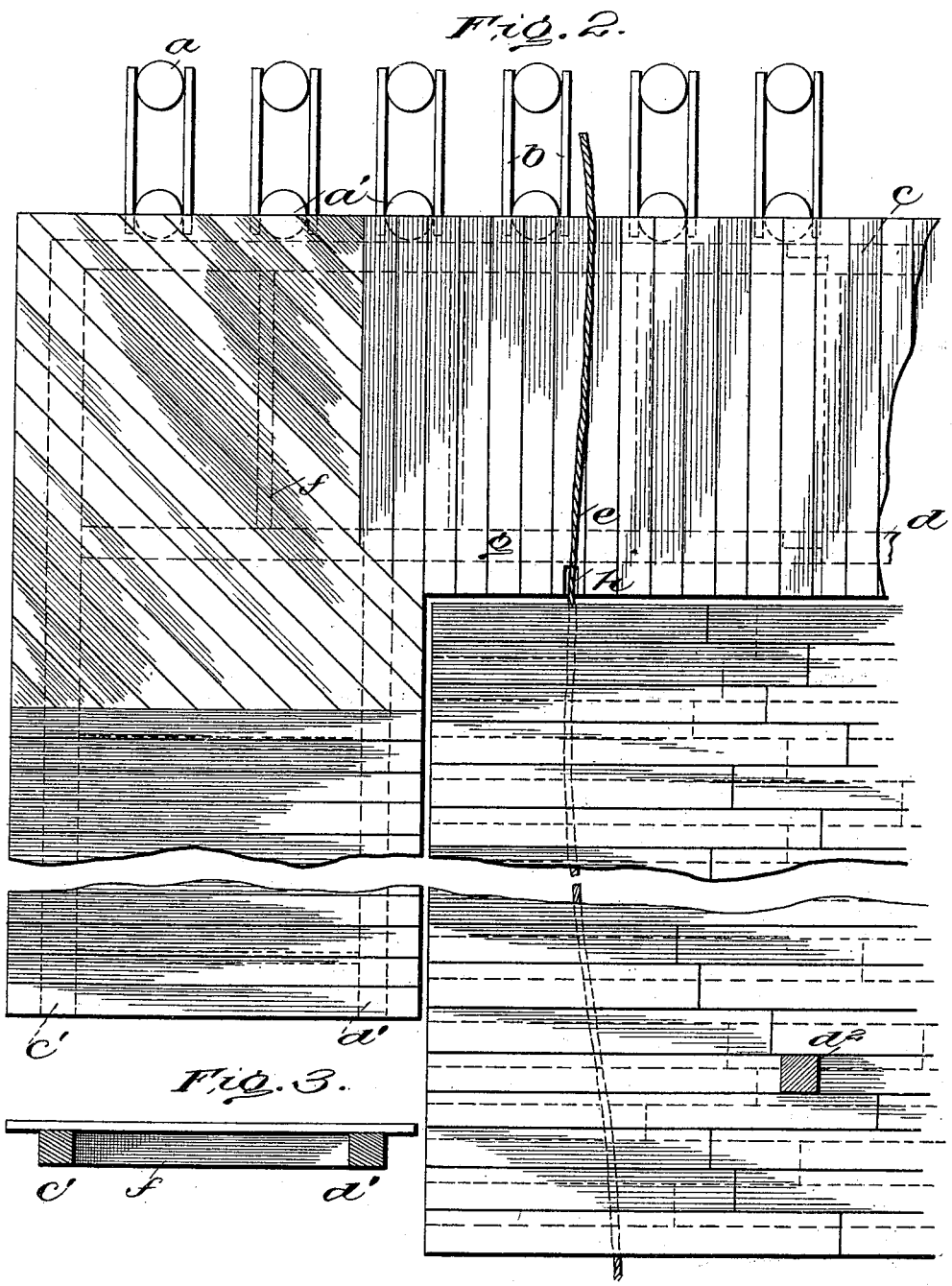
Witnesses
Inventor
Johan Poulsen
by T.J. Geisler
Attorney

UNITED STATES PATENT OFFICE.

JOHAN POULSEN, OF PORTLAND, OREGON.

LUMBER-RAFT.

SPECIFICATION forming part of Letters Patent No. 619,502, dated February 14, 1899.

Application filed January 8, 1898. Serial No. 666,075. (No model.)

*To all whom it may concern:*

Be it known that I, JOHAN POULSEN, a citizen of the United States, and a resident of Portland, Multnomah county, Oregon, have invented a new and useful Improvement in Lumber-Rafts, of which the following is a specification, reference being had to the accompanying drawings as a part thereof.

My invention relates to the transportation of sawed lumber in large bulk in the form of a raft by sea from one place to another.

The object of my invention is to improve upon the construction of such a lumber-raft to better fit it for its journey. When of two places connected by sea, at the one lumber is plentiful, while at the other it is not so, it would be desirable to put a large quantity of lumber together in a compact mass—that is, build the same into a raft and tow it to the place where needed, as this is comparatively a cheap mode of transportation; but the difficulty is to build such lumber in a sufficiently secure manner to be able to stand the journey. I therefore conceived the idea of building a lumber-raft in the manner I am about to describe. This consists in constructing the raft in tiers, the lumber in the second tier being laid at an angle to that of the first and so continuing to cross the lumber alternately throughout the raft, and then building in the raft some stays, whereby to divide or distribute the strain to which the raft will be subjected while at sea, and finally lashing the lumber firmly together.

My invention will be more clearly understood by referring to the drawings.

In the drawings, Figure 1 is a perspective of a lumber-raft built in accordance with my invention. Fig. 2 is a partial plan of a floating dock used by me as a frame in which to build my raft, said figure also showing a partial plan of my raft to illustrate its construction. Fig. 3 is a cross-section showing the construction of said dock, and Figs. 4 and 5 are details.

The letters designate the parts referred to.

Before building my raft I construct the floating dock, making the same of the form to be given the former and of sufficient size to encompass the same. This dock is for a double purpose. In the first place it is a frame or formative within which to build the raft and from which it takes its shape—that is to say, the exterior lines of the raft are made to conform to the interior lines of such dock—and, secondly, the dock provides a platform on which the men engaged in building the raft may walk about while at work. To build the said dock, I first drive down a double row of piles $a$ $a'$ in a straight line and brace the same together by means of strips of wood $b$. This I do to obtain a steady wall against which I may build my dock and to give stability to the latter. The piles being in position, I make a skeleton structure of heavy timbers $c$ $d$ $c'$ $d'$ and braces $f$ and secure said structure to said piles, and I then cover the said skeleton with planking. When finished, the dock will inclose an area of water of the size to be attained by the raft. The inner edges of the platform $g$ are provided with a series of grooves, like $h$, in which to place the cables, whereby the raft is to be bound together. Said grooves $h$ are provided to prevent the sides of the raft from jamming the cables, as the latter must be allowed free play, so that they may be drawn tightly around the raft. Upon the dock being completed a tier of lumber is placed in it lengthwise to the long side of the dock, all lumber used in building such tier being of a uniform thickness. In the middle of such tier are left open a series of post-holes in which to insert the vertical posts $d^2$ to serve as stays for the raft. A convenient way to do this is to make a box or form, as shown in Fig. 4, of the diameter of the post and tacking it temporarily to the abutting planks or timbers, so that when the raft has reached a sufficient height to support the posts such boxes may easily be knocked out, and the posts inserted and suitably secured against falling through. A second tier of lumber is then placed on the first, the pieces being arranged at right angles to the lower tier and built around the post-holes or the boxes marking same, and then another tier is put on like the first, and so on until the raft has been completed, the lumber of the alternate tiers crossing each other at an angle throughout the raft, and occasionally a tier of lumber may be placed diagonally. It will be found convenient to insert the diagonal tiers at the height where the tow-cable is to encircle the raft, and the lumber throughout the raft must be so arranged as to form lap or broken joints. All continuous joints must be avoided, whether extending longitudinally or transversely, for the principles involved in the construction of my raft are that one piece of lumber shall support and brace the other. The upright posts $d^2$ having been inserted in their places and the raft completed, the cables $e$ are drawn around and made as taut as possible. The most convenient way of doing this is to form a loop in the cables on the top of the raft and inserting the end of a strong stick therein, then twisting the cable as tight as it can be gotten, and, finally, securing the free end of the said stick so that it cannot turn back.

At the place of the diagonal tiers, which should be just above the water-line, there should be left four corner-grooves $k$ in which to insert the towing cable or chain, and disposed about the outside of the raft are a number of upright jamming-timbers $i$, which by being placed under the towing-cable are firmly pressed against the exterior of the raft and help to bind the same together.

Should it be deemed preferable, instead of using cables like $e$ for binding the raft together such binding means might be substituted by those shown in Fig. 5 and comprising lower and upper cross-beams $l\ m$, drawn together by means of the vertical rods $n$, having threaded ends and nuts, and washers $o$ being inserted under the bolt-heads and the nuts. Such vertical rods may also be substituted for the posts $d$. This arrangement may be better adapted for towing a very large raft or towing any-sized raft during rough weather.

Now what I claim is—

1. The method of constructing a raft out of lumber for the purpose of the transportation thereof by sea, consisting of building the same in tiers lying one above the other, the lumber of the alternate tiers being arranged at an angle to the lumber in the contiguous tiers, and the lumber being disposed throughout the raft so as to form non-continuous or broken joints; and placing within said raft a series of upright stays, around which the lumber is closely packed, and then tightly binding the lumber together by some suitable means, and providing a series of jamming-timbers to bear against the exterior of the raft, and placing the towing-cable about such jamming-timbers substantially as set forth.

2. The method of constructing a raft out of lumber, for the purpose of transportation thereof by sea, consisting of building the same in tiers lying one above the other, the lumber of the alternate tiers being arranged at an angle to the lumber in the contiguous tiers, and the lumber being disposed throughout the raft so as to form non-continuous or broken joints; and placing within said raft a series of upright posts or stays, around which the lumber is closely packed; then tightly binding the lumber in the raft together by means of cross-beams and drawn together by screw-bolts; and providing a series of jamming-timbers to bear against the exterior of the raft; and placing the towing-cable about such jamming-timbers, substantially as set forth.

3. The method of constructing a raft out of lumber for the purpose of the transportation thereof by sea, consisting of building the same in tiers lying one above the other, the lumber of the alternate tiers being arranged at an angle to the lumber in the contiguous tiers, and the lumber being disposed throughout the raft so as to form non-continuous or broken joints; and placing within said raft a series of upright stays, around which the lumber is closely packed, and then tightly binding the lumber together by some suitable means, substantially as set forth.

In testimony whereof I have hereunto set my signature in the presence of two witnesses.

JOHAN POULSEN.

Witnesses:
H. M. CAKE,
T. J. GEISLER.